US011584672B2

(12) United States Patent
Lentz (10) Patent No.: US 11,584,672 B2
(45) Date of Patent: Feb. 21, 2023

(54) FRACTIONED SEPARATION OF VALUABLE SUBSTANCES FROM AQUEOUS MANY-COMPONENT MIXTURES (71) Applicant: IGAS ENERGY GMBH, Stolberg (DE)

(72) Inventor: Karl-Heinz Lentz, Stolberg (DE)

(73) Assignee: IGAS ENERGY GMBH, Stolberg (DE)

( * ) Notice: Subject to any disclaimer, the term of this patent is extended or adjusted under 35 U.S.C. 154(b) by 247 days.

(21) Appl. No.: 16/633,649

(22) PCT Filed: Jul. 13, 2018

(86) PCT No.: PCT/EP2018/000355
§ 371 (c)(1),
(2) Date: Jan. 24, 2020

(87) PCT Pub. No.: WO2019/020209
PCT Pub. Date: Jan. 31, 2019

(65) Prior Publication Data
US 2020/0247701 A1 Aug. 6, 2020

(30) Foreign Application Priority Data
Jul. 27, 2017 (EP) .................................... 17183498

(51) Int. Cl.
*C02F 11/145* (2019.01)
*C02F 1/20* (2006.01)
(Continued)

(52) U.S. Cl.
CPC ............. *C02F 11/086* (2013.01); *B09B 3/40* (2022.01); *C01B 3/02* (2013.01); *C02F 1/20* (2013.01);
(Continued)

(58) Field of Classification Search
CPC ........... Y02E 50/30; Y02E 20/12; C05F 3/00; C05F 5/00; C05F 7/00; C05F 9/00;
(Continued)

(56) References Cited

U.S. PATENT DOCUMENTS 4,822,497 A   4/1989  Hong et al.
9,061,221 B2  6/2015  Wissemborski et al.
(Continued)

FOREIGN PATENT DOCUMENTS

DE   3885762        11/1993
DE   29719196 U1    12/1997
(Continued)

OTHER PUBLICATIONS

International Search Report issued in PCT/EP2018/000355, dated Oct. 9, 2018, 5 pages.
(Continued)

*Primary Examiner* — Claire A Norris
(74) *Attorney, Agent, or Firm* — Culhane Meadows, PLLC; Jeff B. Vockrodt (57) ABSTRACT The invention relates to a method for the fractioned separation of valuable substances from aqueous many-component mixtures such as aqueous wastes, sludges and sewage sludge under supercritical conditions. The invention also comprises valuable substance fractions that are enriched after the method according to the invention, more particularly phosphorous-containing and phosphorous- and ammonium-containing compounds such as fertilisers and synthesis gas as an energy source and as a valuable substance for the chemicals industry. The invention comprises devices for carrying out the methods. With the method and devices according to the invention, valuable substances can be completely recovered from wastes, sludges and sewage sludge and given a new use. The methods and devices are (Continued)

particularly suitable for recovering phosphorous and ammonium in the form of plant-available fertiliser, for recovering metals and heavy metals, for producing synthesis gas and for obtaining hydrogen from synthesis gas, i.e. for mobility.

10 Claims, 3 Drawing Sheets

(51) Int. Cl.
| | |
|---|---|
| C02F 1/52 | (2006.01) |
| C05F 3/00 | (2006.01) |
| C05F 5/00 | (2006.01) |
| C05F 7/00 | (2006.01) |
| C05F 9/00 | (2006.01) |
| C02F 11/08 | (2006.01) |
| C01B 3/02 | (2006.01) |
| B09B 3/40 | (2022.01) |
| C02F 101/10 | (2006.01) |
| C02F 101/16 | (2006.01) |
| C02F 101/20 | (2006.01) |
| C02F 103/20 | (2006.01) |
| C02F 103/32 | (2006.01) |
| B09B 101/30 | (2022.01) |

(52) U.S. Cl.
CPC .......... *C02F 1/5245* (2013.01); *C02F 11/145* (2019.01); *C05F 3/00* (2013.01); *C05F 5/00* (2013.01); *C05F 7/00* (2013.01); *C05F 9/00* (2013.01); *B09B 2101/30* (2022.01); *C02F 2101/105* (2013.01); *C02F 2101/16* (2013.01); *C02F 2101/20* (2013.01); *C02F 2103/20* (2013.01); *C02F 2103/32* (2013.01); *C02F 2303/10* (2013.01)

(58) Field of Classification Search
CPC ....... C02F 11/086; C02F 11/145; C02F 11/10; C02F 11/18; C02F 1/02; C02F 2209/02; C02F 2209/03; C02F 11/13; C02F 9/00; B09B 3/40; C01B 3/40; C10J 2300/0916
USPC ...................................... 210/603, 188; 71/21
See application file for complete search history.

(56) References Cited

U.S. PATENT DOCUMENTS

| | | | |
|---|---|---|---|
| 2004/0192980 A1* | 9/2004 | Appel | ..................... C05B 17/00 422/600 |
| 2009/0126274 A1 | 5/2009 | Vogel et al. | |
| 2011/0239620 A1 | 10/2011 | Pashkin | |

FOREIGN PATENT DOCUMENTS

| | | |
|---|---|---|
| DE | 19628009 A1 | 1/1998 |
| DE | 19747696 A1 | 5/1999 |
| DE | 29913370 U1 | 9/1999 |
| DE | 19955150 A1 | 6/2001 |
| DE | 10135431 A1 | 2/2003 |
| DE | 20220307 U1 | 4/2003 |
| DE | 10210178 C1 | 6/2003 |
| DE | 10217165 A1 | 2/2004 |
| DE | 102005037469 A1 | 2/2007 |
| DE | 102006044116 | 4/2008 |
| DE | 102007035910 A1 | 2/2009 |
| JP | H11197698 A | 7/1999 |
| JP | H11290875 A | 10/1999 |
| JP | 2002086099 A | 3/2002 |
| JP | 2007524498 A | 8/2007 |
| JP | 2010172859 A | 8/2010 |
| RU | 2015633 C1 | 7/1994 |
| RU | 2008152111 A | 7/2010 |
| WO | 2004087619 A2 | 10/2004 |
| WO | 2010130589 A1 | 11/2010 |

OTHER PUBLICATIONS

Office Action received in Chinese Application No. 201880049826.3 dated Sep. 3, 2021, with translation, 7 pages.
Office Action received in European Application No. 17 183 498.9-1105 dated Oct. 22, 2018, 3 pages.
Office Action received in Indian Application No. 202017007682 dated Mar. 31, 2021, 5 pages.
Office Action received in Indonesian Application No. P00202001619 dated Aug. 20, 2021, with translation, 8 pages.
Office Action received in Korean Application No. 10-2020-7005411 dated Jul. 25, 2022, with translation, 19 pages.
Office Action received in Russian Application No. 2020108185/10 dated Jun. 1, 2021, with translation, 10 pages.
Office Acton received in Japanese Application No. 2020-526674 dated Oct. 18, 2021, 10 pages.

* cited by examiner

FRACTIONED SEPARATION OF VALUABLE SUBSTANCES FROM AQUEOUS MANY-COMPONENT MIXTURES

CROSS-REFERENCE TO RELATED APPLICATION

This application is a 35 U.S.C. 371 National Phase of PCT Application No. PCT/EP2018/000355, filed on Jul. 13, 2018, which claims priority to EP Application No. 17183498.9, filed on Jul. 27, 2017, both of which are hereby incorporated by reference herein in their entirety.

DESCRIPTION

The invention relates to methods for the fractional separation of valuable substances from aqueous multicomponent mixtures such as aqueous wastes, sludges and sewage sludge under supercritical conditions. The invention also includes valuable fractions that are enriched by the method according to the invention, in particular phosphorus-containing and phosphorus- and ammonium-containing compounds such as fertiliser and synthesis gas as an energy source and as valuable material for the chemical industry. With the method according to the invention, valuable substances can be completely recovered from wastes, sludges and sewage sludge and supplied for a new use. In particular, the methods are suitable for the recovery of phosphorus and ammonium in the form of plant-available fertiliser, for the recovery of metals and heavy metals, for the production of synthesis gas and for the recovery of hydrogen from synthesis gas, e.g. for portability.

Aqueous multicomponent mixtures, such as those occurring as sewage sludge for example, contain a large number of valuable substances, including metals, sand, heavy metals and phosphorus and nitrogen.

Phosphorus is a vital substance for plants and animals and an important component of fertilisers for food production and agriculture. In this connection the worldwide phosphorus reserves are limited. Increasingly therefore attempts are being made to recover phosphorus from aqueous wastes and sewage sludge. Currently phosphate, which is used as a fertiliser in agriculture, remains at the end as waste in the form of animal meal, sewage sludge or sewage sludge ash. A direct use of animal meal or sewage sludge as fertiliser is problematic on account of heavy metal contamination and hygienic reasons, and is therefore prohibited or subject to stringent conditions. Many phosphates are furthermore sparingly soluble and unavailable to plants. An objective is therefore to close the phosphate cycle and recover plant-available phosphates from municipal effluents, sewage sludge, animal waste products such as animal meal, and industrial waste.

The recovery of magnesium ammonium phosphate (abbreviated "MAP") from sewage sludge is known. In the known methods, digested sewage sludge is acidified and the solid phase is then separated. Heavy metals are precipitated by the addition of sulphides, and magnesium chloride is added to the remaining solution in order to obtain plant-available MAP ($MgNH_4PO_4 \times 6\ H_2O$). The MAP obtained is not a chemically pure product. The MAPs from different sewage treatment plants differ for example depending on the pre-treatment of the sewage sludges used and the different technical circumstances as regards their composition.

A method for the recovery of magnesium ammonium phosphate from sewage sludge is described in DE102007035910. In this case ripe sludge is first prepared from sewage sludge, and this is then degassed and mixed with air. MAP is precipitated by addition of magnesium chloride and separated by a funnel in the lower part of the reactor (so-called Berlin Plant®).

EP2429674 discloses a method for the recovery of phosphate from sewage sludge, in which a suspension is prepared from sewage sludge with water, alcohol, water/alcohol mixture or aqueous solution, gaseous carbon dioxide or supercritical carbon dioxide is introduced as extracting agent into the suspension, undissolved solids are separated, carbon dioxide is removed and dissolved phosphates are precipitated and separated.

In DE19628009 a method is described for evaporating aqueous salt solutions resulting from the production of mineral fertiliser granules in a heat exchanger, in which the solutions are heated by steam supplied in separate flow paths.

In addition, thermal and wet chemical methods for the working up and disposal of industrial and agricultural waste are known. These also include methods in which the reaction takes place under supercritical conditions.

DE10210178 discloses the conversion of dilute grape marc, with a dry mass of 15%, with supercritical water at an average temperature of 650 degrees Celsius. In this case $H_2$, $CO_2$, $CH_4$ and N2, are obtained as reaction products, which form a homogeneous phase with the excess water and are used in the heat exchanger to heat up new feedstock. The inorganic salts formed are withdrawn from the bottom of the reactor sump and discarded.

DE20220307U1 discloses a plant for carrying out a corresponding method with a cylindrical reactor, which is inclined not more than 30 degrees to the vertical, with pressure lines for supplying feedstock and for the discharge of products and a bottom sump outlet at the lower end of the reactor.

DE102005037469 discloses a method for the separation of inorganic solids from an aqueous solution that contains organic and inorganic solids, comprising the steps of heating the aqueous solution at a pressure between 22.2 and 50 MPa in a heat exchanger to a temperature below the pseudo-critical temperature (350 to 600 degrees Celsius), introducing the heated aqueous solution into at least one separator, in which the inorganic solids are separated from the aqueous solution, and passing the purified aqueous solution to a reactor, in which the aqueous solution is treated at a temperature of 350 and 600 degrees Celsius. DE102005037469 furthermore discloses an apparatus for carrying out the method, comprising a storage tank 1, a pump 2, a heat exchanger 3, at least one separator 4 and a reactor 6.

To work up wet biomass, DE102006044116 discloses a method for the hydrothermal gasification of the biomass in supercritical water at a pressure above 22.1 MPa. Since wet biomass, such as for example fresh plants or marc, often have a high concentration (about 30 wt. %) of organic matter and associated therewith a high viscosity, these wastes are difficult to pump. Therefore, in DE102006044116 wet biomass is diluted with process waste water to 5-20 wt. %, based on the organic matter. After the hydrothermal gasification, first of all the inorganic salts and then the product gases from the process waste water are separated from the reaction products. One part of the process waste water is used to dilute the wet biomass, while the other part and the inorganic salts are disposed of.

DE10217165 discloses a method for treating organic substances, in which the organic matter is introduced into an aqueous phase so that a pumpable phase is produced. The pressure is increased to at least 221 bar and the temperature to at least 374 degrees Celsius, the phase is introduced into a flow reactor, and particles that exceed a minimum size are removed from the product stream. At least 50% of the product stream is recycled to the reactor.

DE3885762 relates to a method for treating water that contains organic and inorganic material, under supercritical conditions and separating the formed solids.

DE10135431 mentions a method for the pre-treatment of reactors for the production of hydrogen, in which the hydrogen is generated from the reaction of organic compounds with supercritical water.

DE29913370 discloses a plant for the treatment of solids in supercritical water in the reaction chamber of a reactor.

DE19955150 relates to a method for generating hydrogen, in which hydrocarbons and/or alcohols are reacted in supercritical water without the use of a catalyst.

DE19747696 describes a method for carrying out chemical reactions in supercritical aqueous systems, in which one or more compounds are reacted in such a way that at least one acid is used or released and the products of the chemical reaction are cooled below the critical state, wherein the cooling is effected by adding an alkaline solution.

DE29719196 discloses a reactor for carrying out supercritical methods.

US 2004/192980 and WO 2004/087619 disclose a method for converting raw feed into at least one usable material, wherein the method comprises preparing a slurry from the raw feed and subsequent two-stage processing.

In the known methods for working up biomass and sewage sludge residues always remain, that have to be disposed of. Methods in which all constituents of the biomass, waste or sewage sludge can be converted into valuable substances, and valuable substances can be completely recovered are not known in the prior art.

Sewage sludge and sewage sludge residues are often incinerated. The sewage sludge incineration produces as much soot as the burning of coal. Valuable substances are lost.

The object of the present invention was to develop a method for the disposal of aqueous wastes, in particular sewage sludge, in which valuable substances (valuable materials) contained in the aqueous waste, such as phosphorus, can be recovered from the waste.

This object is achieved by a method and apparatuses according to claims 1 to 22. In the method, an aqueous multicomponent mixture is used as feedstock 31. Valuable fractions and preferably synthesis gas 45 and water 46 are obtained as products.

The present invention achieves this object by providing a method that enables all constituents in aqueous multicomponent mixtures, such as sewage sludge, to be completely converted into valuable substances and enables the valuable substances to be recovered in fractions. Valuable substances can easily be worked up from the individual fractions and returned to the valuable substances cycle. The method enables the recycling and the conservation of raw material resources such as phosphorus.

A subject matter of the invention is a method for the fractional separation of valuable substances from an aqueous multicomponent mixture, comprising the compression of the aqueous multicomponent mixture to 25 to 35 MPa, heating the compressed aqueous multicomponent mixture to 200 to 300 degrees Celsius, and separation of a first valuable substance fraction 41, further heating of the compressed aqueous multicomponent mixture to 300 to 400 degrees Celsius and separation of a second valuable substance fraction 42, further heating of the compressed aqueous multicomponent mixture to 400 to 550 degrees Celsius and separation of a third valuable substance fraction 43.

A subject matter of the invention is a method for the fractional separation of valuable substances from an aqueous multicomponent mixture, comprising the compression of the aqueous multicomponent mixture to 25 to 35 MPa, heating the compressed aqueous multicomponent mixture to 200 to 300 degrees Celsius, and separation of a first valuable substance fraction 41, in which solids are enriched, further heating of the compressed aqueous multicomponent mixture to 300 to 400 degrees Celsius and separation of a second valuable substance fraction 42, in which metal salts are enriched, further heating of the compressed aqueous multicomponent mixture to 400 to 550 degrees Celsius and separation of a third valuable substance fraction 43, in which phosphate and ammonium are enriched.

Before separation of the third valuable substance fraction 43, one or more precipitating agents such as $Mg^{2+}$, $Ca^{2+}$ and $K^+$ may be added at a temperature of 400 to 550 degrees Celsius. An embodiment of the method for the fractional separation of valuable substances from an aqueous multicomponent mixture comprises the compression of the aqueous multicomponent mixture to 25 to 35 MPa, heating the compressed aqueous multicomponent mixture to 200 to 300 degrees Celsius and separation of a first valuable substance fraction 41, further heating of the compressed aqueous multicomponent mixtures to 300 to 400 degrees Celsius and separation of a second valuable substance fraction 42, further heating of the multicomponent mixture to 400 to 550 degrees Celsius and addition of one or more precipitating agents such as $Mg^{2+}$ and/or $Ca^{2+}$ and/or $K^+$ and separation of a third valuable substance fraction 43. The separation of the first, second and third valuable substance material fraction 41, 42, 43 preferably takes place in each case by means of separators 5.

In the first valuable substance fraction 41 solids are enriched. In the second valuable fraction 42 metal salts are enriched. In the third valuable fraction 43 phosphate and ammonium are enriched.

The method is characterised in that the aqueous multicomponent mixture does not have to be previously dehydrated or dried. Ideally, the aqueous multicomponent mixture has a high water content, for example at least 80 wt. % water, preferably at least 85 wt. % water, preferably at least 86 wt. %, particularly preferably 87 wt. % to 88 wt. % water. This proportion of water is the "optimal concentration". Preferably, the aqueous multicomponent mixture is pumpable. Sewage sludge with a water content of 75 wt. % is for example no longer pumpable. This sewage sludge is diluted to the desired concentration by process internal circulating water. This also applies to all other wastes or waste streams too. In preferred embodiments of the method, the aqueous multicomponent mixture is passed through a cutting device 2.

The method according to the invention is characterised in that the fractional separation of the valuable substances with at least one pump 3, at least three separators 5 and valves 6 is carried out in a closed apparatus with exclusion of oxygen.

The apparatus for carrying out the method according to the invention, comprising at least one pump 3, at least three separators 5 and three valves 6 is characterized in that the apparatus is closed, so that the fractional separation of the valuable substances from the multicomponent mixture is carried out with exclusion of oxygen.

A subject matter of the invention is a method for the fractional separation of valuable substances from a feedstock 31, in particular an aqueous multicomponent mixture, comprising the introduction from a storage tank 1 into the feedstock line 12 and optionally diluting or thickening the feedstock 31, preferably the aqueous multicomponent mixture, to the optimum concentration, optionally the comminution of components in the feedstock 31 (aqueous multicomponent mixture), for example with a cutting device 2, compression to 25 to 35 MPa, for example with a pump 3, in particular a high-pressure pump, and guiding the feedstock line 12 through a heat exchanger 4 to heat the compressed feedstock (compressed aqueous multicomponent mixture) to 200 to 300 degrees Celsius and separation of the first isolated valuable substance fraction 41, for example with a separator 5, guiding the feed line 12 through a second heat exchanger 4 to heat the compressed feedstock (compressed aqueous multicomponent mixture) to 300 to 400 degrees Celsius and separation of a second separated valuable substance fraction 42, for example with a second separator 5, guiding the feed line 12 through a third heat exchanger 4 for heating the compressed feedstock (compressed aqueous multicomponent mixture) to 400 to 550 Celsius degrees and separation of a third separated valuable substance fraction 43, for example with a third separator 5.

A subject matter of the invention is an apparatus for carrying out the method according to the invention, comprising a storage tank 1, a feedstock line 12 connected to the storage tank 1 for transporting the aqueous multicomponent mixture with exclusion of oxygen, optionally a cutting device 2 connected to the feedstock line 12 for comminuting components in the feedstock 31 (aqueous multicomponent mixture), a pump 3 connected to the cutting device 2, if present, via the feedstock line 12, in particular a high-pressure pump, for compressing the feedstock 31 to 25 to 35 MPa, and guiding the feedstock line 12 through a heat exchanger 4 for heating the compressed feedstock 31 (compressed aqueous multicomponent mixture) to 200 to 300 degrees Celsius and subsequently guiding the feedstock line 12 through a separator 5 for separating the first isolated valuable substance fraction 41, in which solids are enriched, guiding the feedstock line 12 through a second heat exchanger 4 for heating the compressed feedstock (compressed aqueous multicomponent mixture) to 300 to 400 degrees Celsius and subsequently guiding the feedstock line 12 through a second separator 5 for separating a second isolated valuable substance fraction 42, in which metal salts are enriched, guiding the feedstock line 12 through a third heat exchanger 4 for heating the compressed feedstock (compressed aqueous multicomponent mixture) to 400 to 550 Celsius degrees and subsequently guiding the feedstock line 12 through a third separator 5 for separating a third isolated valuable substance fraction 43, in which phosphate and ammonium are enriched.

An aqueous multicomponent mixture is preferably used as feedstock 31 in the method according to the invention. In many cases the aqueous multicomponent mixture contains organic constituents. The method according to the invention is particularly suitable for separating valuable substances from aqueous multicomponent mixtures that contain organic constituents, and for providing the valuable substances for a new use.

Aqueous multicomponent mixtures which can be used as feedstock 31 in the method according to the invention are for example sludge, sewage sludge, organic waste, waste from biogas plants, aqueous organic waste, industrial waste, municipal waste, animal waste, agricultural waste, garden waste, animal meal, vegetable waste, marc, fly ash, sewage sludge fly ash, food industry waste, drilling mud, digestate, liquid manure, waste water such as industrial waste water. In a particularly preferred embodiment of the method, the aqueous multicomponent mixture is sewage sludge.

The aqueous multicomponent mixture may further contain inorganic constituents, such as for example metals and heavy metals or metal ions, metal salts, metal oxides, heavy metal ions, heavy metal salts, heavy metal oxides, phosphorus, phosphorous oxide, phosphate, nitrogen, nitrogen oxides and ammonium.

Valuable substances within the meaning of the invention are all organic and inorganic constituents that are contained in the respective multicomponent mixture, for example phosphorus, for example in the form of phosphate, nitrogen, for example in the form of ammonium, metals, for example in the form of metal ion salts, heavy metals, for example in the form of heavy metal ion salts, silicon for example in the form of sand, calcium, for example in the form of sand, carbon, for example in the form of carbon dioxide and methane, low molecular weight hydrocarbons such as ethene, propene, butene, hydrogen from hydrocarbons and water. Preferably, the water obtained by the method is purified. In this case purified, dischargeable water is obtained.

A subject matter of the invention is the use of the method according to the invention for producing (recovering) dischargeable water from organic multicomponent mixtures such as sludge, sewage sludge, organic waste, waste from biogas plants, aqueous organic waste, industrial waste, municipal waste, animal waste, agricultural waste, garden waste, animal meal, vegetable waste, marc, fly ash, sewage sludge fly ash, food industry waste, drilling mud, digestate, liquid manure, waste water such as industrial waste water. By separating virtually all substances (valuable substances) from the aqueous multicomponent mixture, water is obtained that is so clean that it may be discharged into bodies of water without further treatment. Water that is so clean that it can be discharged directly into bodies of water is referred to as "dischargeable water". The method according to the invention can be used to produce (recover) dischargeable water from sludge, sewage sludge, organic waste, waste from biogas plants, aqueous organic waste, industrial waste, municipal waste, animal waste, agricultural waste, garden waste, animal meal, vegetable waste, marc, fly ash, sewage sludge fly ash, food industry waste, drilling mud, digestate, liquid manure, and waste water such as industrial waste water. A corresponding method is not known in the prior art.

The apparatus according to the invention can be used to produce (recover) dischargeable water from sludge, sewage sludge, organic waste, waste from biogas plants, aqueous organic waste, industrial waste, municipal waste, animal waste, agricultural waste, garden waste, animal meal, vegetable waste, marc, fly ash, sewage sludge fly ash, food industry waste, drilling mud, digestate, liquid manure, and waste water such as industrial waste water.

The method according to the invention provides exclusively valuable substances; no residues remain that have to be disposed of. All constituents of the aqueous multicomponent mixture which is used as feedstock are converted into valuable substances or separated as valuable substances from the multicomponent mixture, and no residue remains that has to be disposed of.

Figure 1:
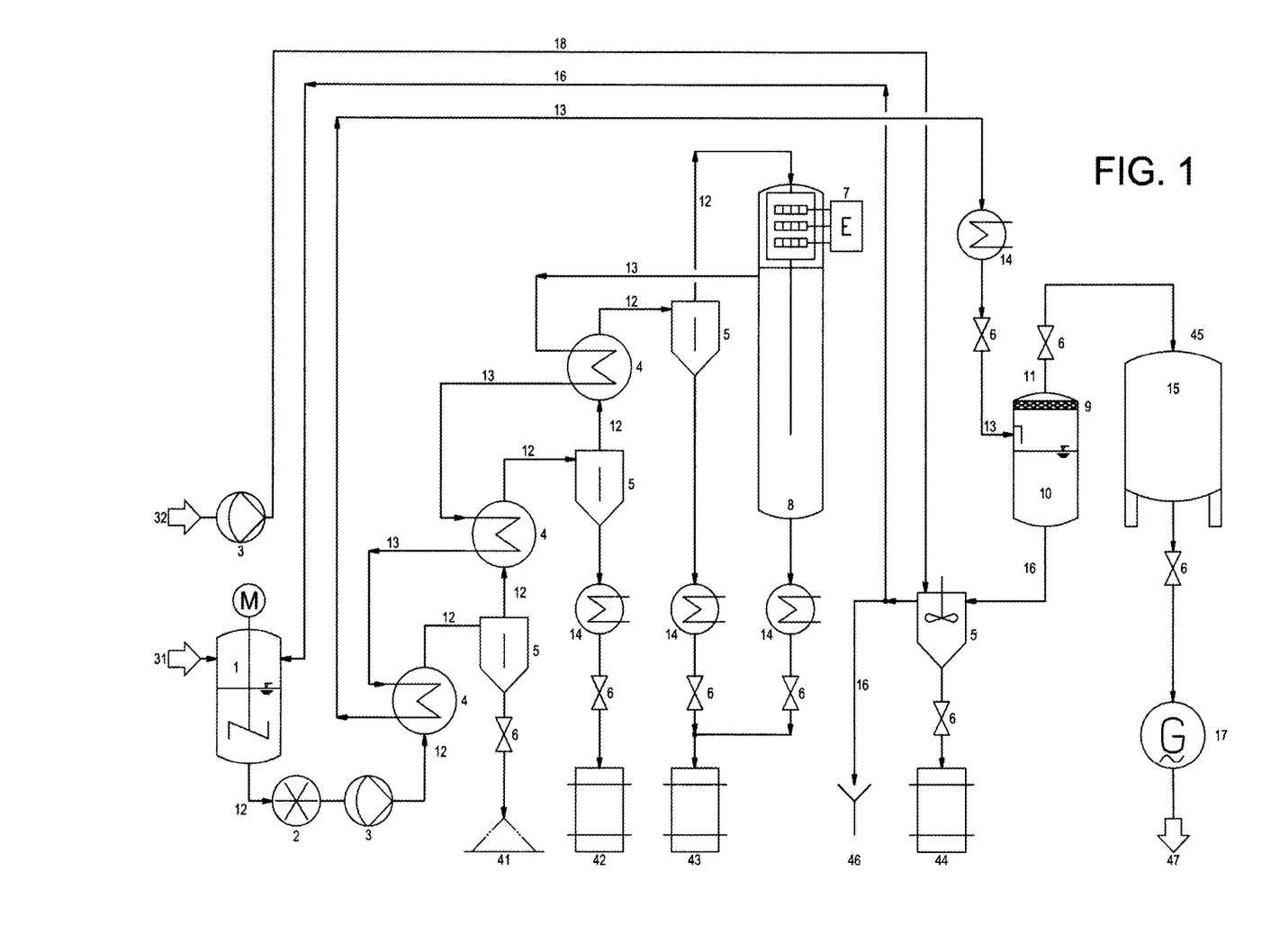
Figure 2:
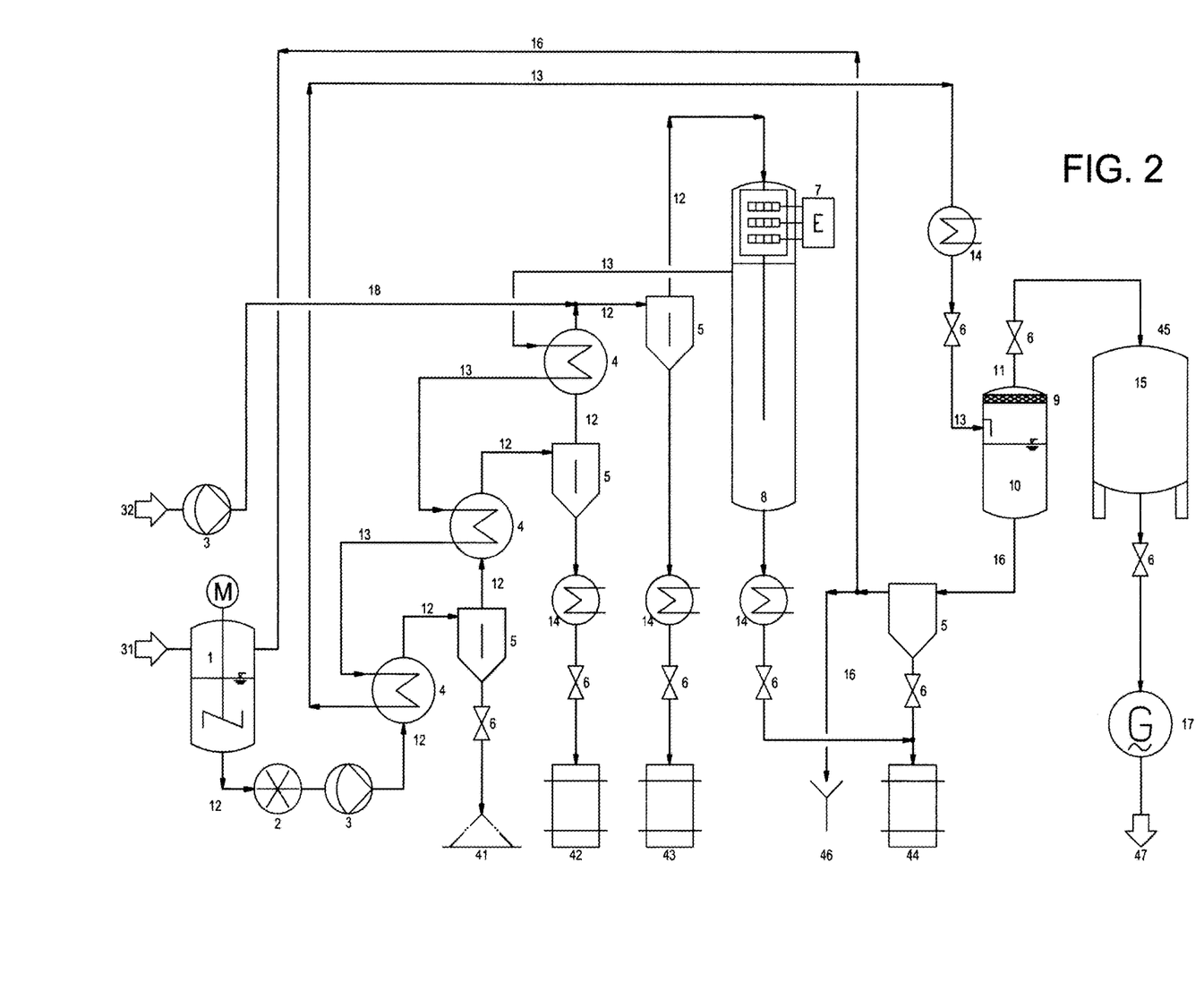
Figure 3:
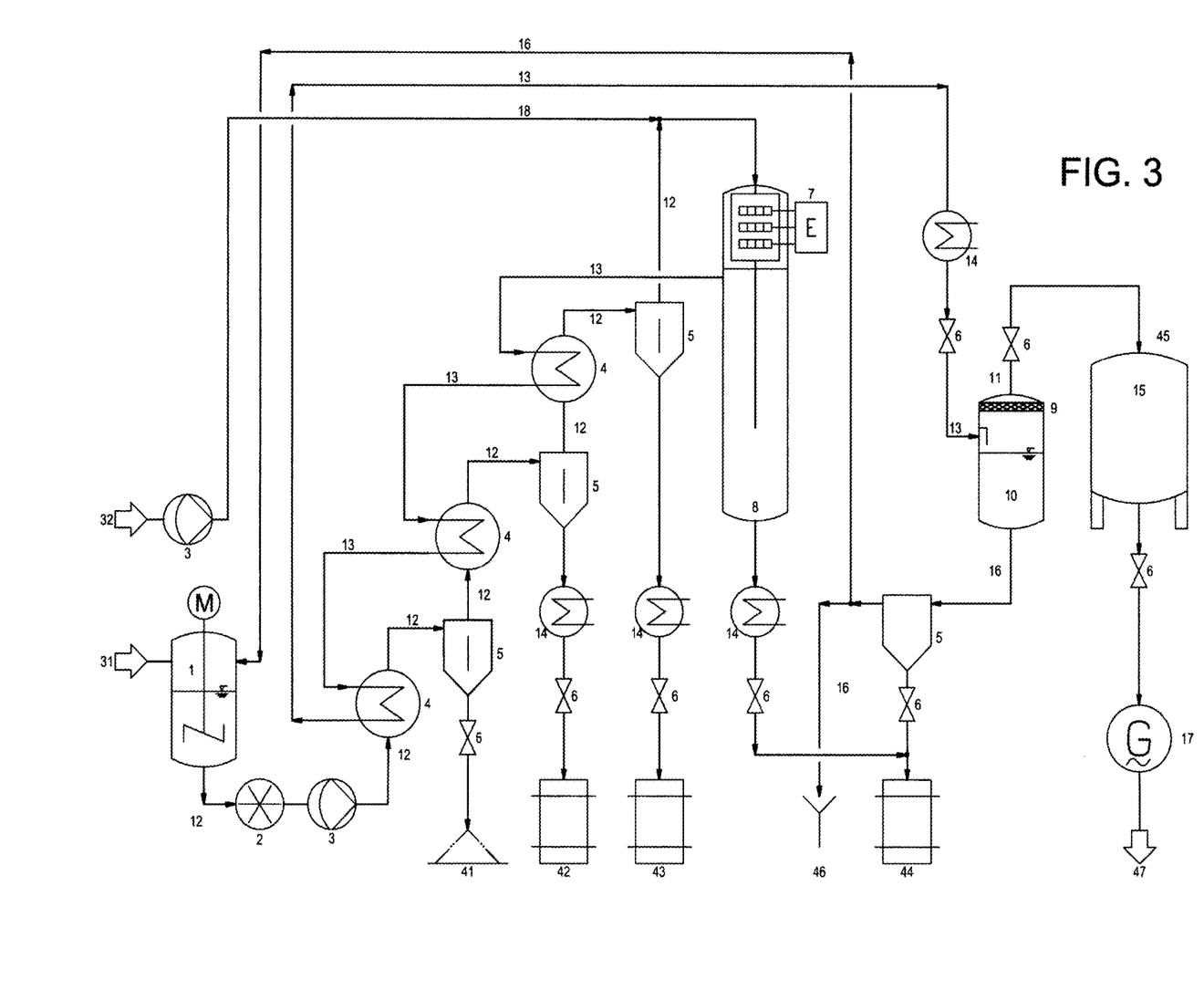

It is a particular characteristic feature of the method according to the invention that the separation of the valuable substance fractions and the conversion and separation of valuable substances from the aqueous multicomponent mixture is carried out under supercritical conditions and without the addition of oxygen and/or catalysts. To this end the aqueous multicomponent mixture that is used as feedstock 31 in the method according to the invention is introduced into a line system. The line system is part of the apparatus for performing the method according to the invention. The line system comprises a feedstock line 12 and product line 13 and may include a storage tank 1. The storage tank 1 may also contain a thickening device. The aqueous multicomponent mixture is compressed via the feedstock line 12 with a pump 3 to a pressure of 25 to 35 MPa and the individual method steps are carried out in a closed circuit in an apparatus, for example as illustrated in FIG. 1, FIG. 2 and FIG. 3. The aqueous multicomponent mixture is compressed under supercritical conditions during the implementation of the method and is referred to as "compressed aqueous multicomponent mixture". In this connection, an initial pressure of 25 to 35 MPa is adjusted. Within the apparatus, for example an apparatus according to FIG. 1, FIG. 2 or FIG. 3, in which the method is carried out, the pressure is reduced due to the pressure losses in the equipment, though the pressure remains within the range of supercritical conditions.

In a particularly preferred embodiment of the method, the compressed aqueous multicomponent mixture is heated in a reactor 8 to a maximum of 700 degrees Celsius after the separation of the first, the second and third valuable fraction 41, 42, 43. The heating in the reactor takes place under supercritical pressure and in the absence of oxygen. The compressed aqueous multicomponent mixture in the reactor 8 is preferably heated to at least 600, more preferably to a maximum of 680 degrees Celsius.

A subject matter of the invention is a method for the fractional separation of valuable substances from a feedstock 31/aqueous multicomponent mixture, comprising introducing the feedstock 31, in particular an aqueous multicomponent mixture, from a storage tank 1 into the feedstock line 12, optionally comminuting components in the feedstock/aqueous multicomponent mixture for example with a cutting device 2, compression to 25 to 35 MPa, for example with a pump 3, in particular a high-pressure pump, and guiding the feedstock line 12 through a heat exchanger 4 for heating the compressed feedstock 31/compressed aqueous multicomponent mixture to 200 to 300 degrees Celsius, and separation of the first isolated valuable substance fraction 41, for example with a separator 5, guiding the feedstock line 12 through a second heat exchanger 4 for heating the compressed feedstock 31/compressed aqueous multicomponent mixture to 300 to 400 degrees Celsius and separation of a second isolated valuable substance fraction 42, for example with a second separator 5, guiding the feedstock line 12 through a third heat exchanger 4 for heating the compressed feedstock 31/compressed aqueous multicomponent mixture to 400 to 550 degrees Celsius and separation of a third isolated valuable substance fraction 43, for example with a third separator 5, guiding the feedstock line 12 into a reactor 8, preferably guiding the feedstock line 12 via a superheater 7 into a reactor 8. By means of the superheater 7 the compressed feedstock 31/compressed aqueous multicomponent mixture is heated to a maximum of 700 degrees Celsius, preferably 600 to 680 degrees Celsius.

A subject matter of the invention is an apparatus for carrying out the method according to the invention, comprising a storage tank 1 for introducing the feedstock 31 (compressed aqueous multicomponent mixture), a feedstock line 12 connected to the storage tank 1 for transporting the feedstock 31 (compressed aqueous multicomponent mixture) with exclusion of oxygen, optionally a cutting device 2 connected to the feedstock line 12 for comminuting components in the feedstock 31 (compressed aqueous multicomponent mixture), a pump 3 connected to the cutting device 2, if present, via the feedstock line 12, in particular a high-pressure pump, for compressing the feedstock 31 (compressed aqueous multicomponent mixture) to 25 to 35 MPa, and guiding the feedstock line 12 through a heat exchanger 4 for heating the compressed feedstock 31 (compressed aqueous multicomponent mixture) to 200 to 300 degrees Celsius and subsequently guiding the feedstock line 12 through a separator 5 for separating the first isolated valuable substance fraction 41, in which solids are enriched, guiding the feedstock line 12 through a second heat exchanger 4 for heating the compressed feedstock 31 (compressed aqueous multicomponent mixture) to 300 to 400 degrees Celsius and subsequently guiding the feedstock line 12 through a second separator 5 for separating a second isolated valuable substance fraction 42, in which metal salts are enriched, guiding the feedstock line 12 through a third heat exchanger 4 for heating the compressed feedstock 31 (compressed aqueous multicomponent mixture) to 400 to 550 Celsius degrees and subsequently guiding the feedstock line 12 through a third separator 5 for separating a third isolated valuable substance fraction 43, in which phosphate and ammonium are enriched, guiding the feedstock line 12 into a reactor 8, preferably guiding the feedstock line 12 via a superheater 7 into a reactor 8 for heating the compressed feedstock 31 (compressed aqueous multicomponent mixture) to a maximum of 700 degrees Celsius, preferably 600 to 680 degrees Celsius.

In particularly preferred embodiments of the method the compressed aqueous multicomponent mixture remains in the reactor 8 at the selected temperature for 1 to 5 minutes, preferably 2 to 3 minutes, particularly preferably 30 seconds, 40 seconds, 50 seconds, 60 seconds, 70 seconds, 80 seconds or 90 seconds. The compressed aqueous multicomponent mixture is preferably heated after the separation of the first, second and the third valuable substance fraction 41, 42, 43 at 25 to 30 MPa with exclusion of oxygen to at least 600 degrees and at most 700 degrees Celsius. Preferably, the compressed aqueous multicomponent mixture in the reactor 8 at the temperature of 600 to 700 degrees Celsius has a pressure of 25 to 30 MPa. The method according to the invention is characterised in that the aqueous multicomponent mixture present in the reactor 8 is under supercritical conditions. In the reactor 8 a hydrothermal gasification (thermochemical gasification) takes place under these conditions, whereby further components from the aqueous multicomponent mixture are converted into valuable substances and are obtained as reaction products. The compressed aqueous multicomponent mixture is preferably heated to at least 600 degrees and at most 700 degrees Celsius at 25 to 30 MPa after the separation of the first, second and third valuable substance fraction 41, 42, 43, and is then cooled.

In the reactor 8 a reaction product comprising synthesis gas 45 and water 46 is formed under the supercritical conditions. The reaction product is present in the reactor 8 under supercritical conditions, i.e. at a pressure of 25 MPa or more and at a high temperature.

The formed reaction product can be cooled in various ways, wherein the energy of the reaction product is preferably used. For example, the reaction product that is present in the reactor 8 under supercritical conditions can be used to heat new feedstock 31, i.e. new aqueous multicomponent mixture. A corresponding circulation system for the recovery and use of the reaction energy is preferred according to the invention. For this purpose, the reaction product is led through the product line 13. The product line 13 passes through one or more, preferably three, heat exchangers 4. In the heat exchangers 4 the thermal energy of the reaction product is transferred to compressed feedstock 31, preferably compressed aqueous multicomponent mixture, which is thereby heated in stages.

A subject matter of the invention is a method for the fractional separation of valuable substances from a feedstock 31, preferably an aqueous multicomponent mixture, comprising introducing the feedstock 31, preferably aqueous multicomponent mixture, from a storage tank 1 into the feedstock line 12, optionally comminuting components in the aqueous multicomponent mixture, for example with a cutting device 2, compression to 25 to 35 MPa, for example with a pump 3, in particular a high-pressure pump, and guiding the feedstock line 12 through a heat exchanger 4 for heating the compressed aqueous multicomponent mixture to 200 to 300 degrees Celsius, and separating the first isolated valuable substance fraction 41, for example with a separator 5, guiding the feedstock line 12 through a second heat exchanger 4 for heating the compressed aqueous multicomponent mixture to 300 to 400 degrees Celsius and separating a second isolated valuable substance fraction 42, for example, with a second separator 5, guiding the feed line 12 through a third heat exchanger 4 for heating the compressed aqueous multicomponent mixture to 400 to 550 degrees Celsius and separation of a third isolated valuable substance fraction 43, for example, with a third separator 5, guiding the feedstock line 12 into a reactor 8, preferably guiding the feedstock line 12 via a superheater 7 into a reactor 8 and heating the compressed aqueous multicomponent mixture in the superheater 7 to a maximum of 700 degrees Celsius, preferably 600 to 680 degrees Celsius, guiding the reaction product through the product line 13 through the third heat exchanger 4 for heating compressed aqueous multicomponent mixture to 400 to 550 degrees Celsius, guiding the reaction product through the product line 13 through the second heat exchanger 4 for heating compressed aqueous multicomponent mixture to 300 to 400 degrees Celsius, guiding the reaction product through the product line 13 through the first heat exchanger for heating compressed aqueous multicomponent mixture to 200 to 300 degrees Celsius, optionally guiding the reaction product through one or more coolers 1 in order to cool the reaction product to below 100 degrees Celsius, preferably to below 50 degrees Celsius, particularly preferably to room temperature, and then optionally expansion through a valve 6.

A subject matter of the invention is an apparatus for carrying out the method according to the invention, comprising a storage tank 1, a feedstock line 12 connected to the storage tank 1 for transporting the feedstock 31 (aqueous multicomponent mixture) with exclusion of oxygen, optionally a cutting device 2 connected to the feedstock line 12 for comminuting components in the feedstock 31 (aqueous multicomponent mixture), a pump 3 connected to the cutting device 2, if present, via the feedstock line 12, in particular a high-pressure pump, for compressing the feedstock 31 (aqueous multicomponent mixture) to 25 to 35 MPa, and guiding the feedstock line 12 through a heat exchanger 4 for heating the compressed feedstock 31 (compressed aqueous multicomponent mixture) to 200 to 300 degrees Celsius and subsequently guiding the feedstock line 12 through a separator 5 for separating the first isolated valuable substance fraction 41, in which solids are enriched, guiding the feedstock line 12 through a second heat exchanger 4 for heating the compressed feedstock 31 (compressed aqueous multicomponent mixture) to 300 to 400 degrees Celsius and subsequently guiding the feedstock line 12 through a second separator 5 for separating a second isolated valuable substance fraction 42, in which metal salts are enriched, guiding the feedstock line 12 through a third heat exchanger 4 for heating the compressed feedstock 31 (compressed aqueous multicomponent mixture) to 400 to 550 Celsius degrees and subsequently guiding the feedstock line 12 through a third separator 5 for separating a third isolated valuable substance fraction 43, in which phosphate and ammonium are enriched, guiding the feedstock line 12 into a reactor 8, preferably guiding the feedstock line 12 via a superheater 7 into a reactor 8 for heating the compressed feedstock 31 (compressed aqueous multicomponent mixture) to a maximum of 700 degrees Celsius, preferably 600 to 680 degrees Celsius, a product line 13 for guiding the reaction product through the third heat exchanger 4 for heating the feedstock 31 (compressed aqueous multicomponent mixture) to 400 to 550 degrees Celsius, optionally guiding the product line 13 through the second heat exchanger 4 for heating the feedstock 31 (compressed aqueous multicomponent mixture) to 300 to 400 degrees Celsius, optionally guiding the product line 13 through the first heat exchanger for heating the feedstock 31 (compressed aqueous multicomponent mixture) to 200 to 300 degrees Celsius, optionally one or more coolers 14 for cooling the reaction product to below 100 degrees Celsius, preferably to below 50 degrees Celsius, particularly preferably to room temperature, and optionally a valve 6 for expanding the cooled reaction product.

The energy that is contained in the reaction product in the reactor 8 can also be used or stored in other ways.

By cooling and expansion of the reaction product, synthesis gas 45 is released from the reaction product.

$H_2$, $CH_4$, $CO_2$ are enriched in the synthesis gas 45. The synthesis gas 45 may include alkanes. In preferred embodiments, the synthesis gas 45 consists at least 90%, preferably at least 95%, particularly preferably 98% or more, of $H_2$, $CH_4$, $CO_2$. Under supercritical conditions in the reactor 8, the synthesis gas 45 is dissolved in the water 46. On cooling, the synthesis gas 45 is released and can be separated from the water 46 or the aqueous residue. A subject matter of the invention is synthesis gas 45 obtainable by the method according to the invention. A subject matter of the invention is the use of synthesis gas 45 obtainable by the method according to the invention.

The reaction product comprises synthesis gas 45 and water 46. Preferably, the reaction product consists substantially of synthesis gas 45 and water 46, preferably at least 99 wt. % or 98 wt. %, particularly preferably 97 wt. % or less of synthesis gas 45 and water 46. The synthesis gas 45 and/or the water 46 may include residues. The reaction product predominantly comprises synthesis gas 45 and water 46, and residues of less than 1 wt. %. In preferred embodiments the reaction product consists at least 90%, preferably at least 95%, particularly preferably 98% or more, of $H_2$, $CH_4$, $CO_2$ and water. A subject matter of the invention is a reaction product obtainable by the method according to the invention. A subject matter of the invention is the use of reaction product obtainable by the method according to the invention. The water that is obtained at this point is dischargeable water. The method can be used to produce dischargeable water as described above. The apparatus according to the invention can be used to produce (recover) dischargeable water as described above.

A subject matter of the invention is a method for the fractional separation of valuable substances from an aqueous multicomponent mixture, comprising introducing the feedstock 31, preferably aqueous multicomponent mixture from a storage tank 1, into the feedstock line 12, optionally comminuting components in the aqueous multicomponent mixture, for example with a cutting device 2, compression to 25 to 35 MPa, for example with a pump 3, in particular a high-pressure pump, and guiding the feedstock line 12 through a heat exchanger 4 for heating the compressed aqueous multicomponent mixture to 200 to 300 degrees Celsius and separation of the first isolated valuable substance fraction 41, for example with a separator 5, guiding the feedstock line 12 through a second heat exchanger 4 for heating the compressed aqueous multicomponent mixture to 300 to 400 degrees Celsius and separation of a second isolated valuable substance fraction 42, for example with a second separator 5, guiding the feedstock line 12 through a third heat exchanger 4 for heating the compressed, aqueous multicomponent mixture to 400 to 550 degrees Celsius and separation of a third isolated valuable substance fraction 43, for example with a third separator 5, guiding the feedstock line 12 into a reactor 8, preferably guiding the feedstock line 12 via a superheater 7 into a reactor 8. By means of the superheater the compressed aqueous multicomponent mixture is heated to a maximum of 700 degrees Celsius, preferably 600 to 680 degrees Celsius, the reaction product is led through the product line 13 through the third heat exchanger 4 for heating compressed aqueous multicomponent mixture to 400 to 550 degrees Celsius, the reaction product is then led through the product line 13 through the second heat exchanger 4 for heating compressed aqueous multicomponent mixture to 300 to 400 degrees Celsius, the reaction product is then passed through the product line 13 through the first heat exchanger for heating compressed aqueous multicomponent mixture to 200 to 300 degrees Celsius, the reaction product is then optionally passed through one or more coolers 14 in order to cool the reaction product to below 100 degrees Celsius, preferably to below 50 degrees Celsius, particularly preferably to room temperature, and is then expanded through a valve 6, and for separating synthesis gas 45 and aqueous residue or water 46 is introduced into a separation vessel 10.

The above-described apparatus can comprise a separation vessel 10 for this purpose. The apparatus can furthermore comprise a demister 9 for separating the synthesis gas. The apparatus can furthermore comprise a gas storage unit 15. A corresponding apparatus is shown in FIG. 1, FIG. 2 and FIG. 3.

The above methods may comprise the following further steps: For the separation of synthesis gas 45 and aqueous residue or water 46, the reaction product is introduced into a separation vessel 10. The synthesis gas 45 is separated, preferably via a demister 9. Firstly, the synthesis gas 45 can then be transferred to a gas storage tank 15. First the synthesis gas 45 can then be transferred to a gas storage tank 15. In this connection the gas storage tank 15 is also an energy store, since the synthesis gas 45 is recovered under high pressure of between 150-200 bar or more. The synthesis gas 45 obtained can be used with or without prior transfer to a gas storage tank 15, for example as follows:

a) the synthesis gas 45 can be used to generate electricity, for example can be fed into a combined heat and power plant (CHP) 17;

b) hydrogen can be separated from the synthesis gas 45 in a gas treatment plant and the hydrogen can then be used for example for portability or industrial applications, and optionally the remaining synthesis gas, which consists mainly of $CO_2$, $CH_4$ and alkanes, can be used to generate electricity;

c) the synthesis gas can be used for the production of chemical products, such as methanol;

d) the synthesis gas 45 and waste heat from the method can be used to generate useful heat such as steam.

The above methods may comprise the following further steps: to separate synthesis gas 45 and aqueous residue or water 46, the reaction product is passed into a separation vessel 10. The water 46 is recovered in the method according to the invention preferably in the form of a water jet. The water 46 and the water jet is also obtained under high pressure, for example 150 to 200 bar. The pressure of the water 46/water jet may be slightly lower than the pressure of the synthesis gas 46. As a rule, the pressure of the water 46/water jet is at most 2%, preferably at most 1.8% less than the pressure of the synthesis gas 45. The aqueous residue or water 46 can for example a) be directly further used or discharged;

b) be mixed with precipitating agents such as $Mg^{2+}$, $Ca^{2+}$ or $K^+$ and phosphate and/or ammonium can be separated, preferably via a separator 5;

c) be filtered and then further used d) for diluting new feedstock 31.

A portion of the water is preferably used to dilute new feedstock 31. To this end the water 46 or the aqueous residue is recycled via the circulation water line 16. The water 46 obtained in the method according to the invention is purified so that it can be discharged. In preferred embodiments of the method water 46 having a purity of more than 99%, preferably more than 99.5%, particularly preferably more than 99.9 vol. % $H_2O$, is obtained. In particularly preferred embodiments of the method water having a purity of 99.999 vol. % $H_2O$ is obtained. Preferably, most of the water 46 obtained can be discharged or is discharged as purified water. On account of its high purity, the water 46 is dischargeable.

The method according to the invention is characterised in that under supercritical conditions, valuable substances are converted into at least three, preferably at least four, valuable substance fractions, which can be separated from the aqueous multicomponent mixture. The reaction product, which comprises synthesis gas 45 and water 46, is according to the invention also a valuable substance fraction.

The organic constituents in the aqueous multicomponent mixture separate under supercritical conditions from the valuable substances and are converted by thermo-chemical gasification into synthesis gas 45. Preferably, all method steps of the valuable substance separation and isolation, at least until the method step of the thermochemical gasification, take place inclusively in the reactor 8 under supercritical conditions. In this connection the organic components in the multicomponent mixture are gasified with supercritical water at pressures and temperatures above the critical point of the water (22.1 MPa and 374 degrees Celsius). Under these conditions the supercritical water readily dissolves organic substances, while inorganic salts precipitate at the same time. This effect is intensified when the density of the water falls below a value of 200 kg/m$^3$. This value occurs at temperatures just above the so-called pseudo-critical temperature. The present method is characterised in that the aqueous multicomponent mixture is heated at pressures of at least 25 MPa. The different solubility of the components contained in the multicomponent mixture, such as for example the solubility of metal ions and organic substances, is utilised during the heating under supercritical conditions to separate the valuable substance fractions.

The first valuable substance fraction 41 is separated or precipitated from the aqueous multicomponent mixture at at least 25 MPa and preferably at most 35 MPa and at a temperature of 200 to 300 degrees Celsius, and can then be isolated for example by means of a separator 5 and a valve 6. In the first valuable substance fraction 41 solids are enriched, for example metals, solid minerals, sand, for example calcium, silicon, for example in the form of their oxides. Valuable substances in the first valuable substance fraction 41 are for example calcium, silicon and their oxides, metals and sand. A subject matter of the invention is the first valuable substance fraction 41 obtainable by the method according to the invention. A subject matter of the invention is the use of the first valuable substance fraction 41 obtainable by the method according to the invention.

The second valuable fraction 42 is separated or precipitates out from the aqueous multicomponent mixture at at least 25 MPa and at a temperature of 300 to 400 degrees Celsius, and can then be isolated for example by means of a second separator 5 and a second valve 6. In the second valuable substance fraction 42 metal salts are enriched, preferably solid or liquid metal salts, for example metal salts that include iron, aluminium, nickel, zinc, cadmium, lead, or manganese. Valuable substances in the second valuable fraction 42 are for example iron, aluminium, nickel, zinc, cadmium, lead, manganese in the form of their salts. A subject matter of the invention is the second valuable fraction 42 obtainable by the method according to the invention. A subject matter of the invention is the use of the second valuable substance fraction 42 obtainable by the method according to the invention.

The third valuable substance fraction 43 is separated or precipitates out from the aqueous multicomponent mixture at at least 25 MPa and a temperature increase to 400 to 550 degrees Celsius. For the complete separation of the valuable substances phosphate and ammonium in the third valuable substance fraction 43, a precipitating agent 32 such as $Mg^{2+}$ or $Ca^{2+}$ or $K^+$ or $Mg^{2+}$ and $Ca^{2+}$ or $Mg^{2+}$ and $K^+$ or $Ca^{2+}$ and $K^+$ or $Mg^{2+}$ and $Ca^{2+}$ and $K^+$ are added, and phosphate and ammonium are thereby completely separated and isolated in the third valuable substance fraction 43. $Mg^{2+}$ or $Ca^{2+}$ or $K^+$ or $Mg^{2+}$ and $Ca^{2+}$ or $Mg^{2+}$ and $K^+$ or $Ca^{2+}$ and $K^+$ or $Mg^{2+}$ and $Ca^{2+}$ and $K^+$ serve in this connection as precipitating agents 32 for the separation of phosphate and/or ammonium. The precipitating agent 32 is added via a line with precipitating agent 18 to the compressed aqueous multicomponent mixture that is contained in the feedstock line 12 (FIG. 2). For example, the compressed aqueous multicomponent mixture can be introduced into the separator 5 and the precipitating agent 32 can also be introduced into the separator 5. A subject matter of the invention is the third valuable substance fraction 43 obtainable by the method according to the invention with addition of precipitating agent in the third valuable substance fraction 43. A subject matter of the invention is the use of the third valuable substance fraction 43 obtainable by the method according to the invention with addition of precipitating agent in the third valuable substance fraction 43.

Alternatively, without addition of precipitating agent 32, for example $Mg^{2+}$ or $Ca^{2+}$ or $K^+$, only some of the phosphate and ammonium in the third valuable substance fraction 43 is separated and isolated, while some of the phosphate and ammonium remains in solution and can be separated elsewhere in the method (FIG. 1 and FIG. 3). A subject matter of the invention is the third valuable substance fraction 43 obtainable by the method according to the invention, without addition of precipitating agent in the third valuable substance fraction 43. A subject matter of the invention is the use of the third valuable substance fraction 43 obtainable by the method according to the invention without addition of precipitating agent in the third valuable substance fraction 43. The complete separation of phosphate and/or ammonium is carried out by adding precipitating agent 32 either in the third valuable substance fraction or from the reaction product or the obtained aqueous residue or water 46.

In the fourth valuable substance fraction, which comprises synthesis gas 45 and water 46, phosphate and/or ammonium can be separated by addition of precipitating agent 32. For example, after cooling and depressurisation of the reaction product and separation of the synthesis gas 45, precipitating agent 32 is added to the aqueous solution or to the water (FIG. 1). Alternatively, precipitating agent 32 can for example be added to the reactor 8 (FIG. 3). After separation of the synthesis gas 45, phosphate and ammonium can for example be separated by adding $Mg^{2+}$ or $Ca^{2+}$ or $K^+$ or $Mg^{2+}$ and $Ca^{2+}$ or $Mg^{2+}$ and $K^+$ or $Ca^{2+}$ and $K^+$ or $Mg^{2+}$ and $Ca^{2+}$ and $K^+$ are added. The separation of the phosphate and ammonium in or immediately before the fourth valuable substance fraction, i.e. after the thermochemical gasification and optionally after separation of the synthesis gas 45, can take place after cooling and depressurisation, i.e. at room pressure and room temperature. The separation of phosphate and/or ammonium can according to the invention be carried out at various places in the method. The separation of phosphate and/or ammonium is characterised in that precipitating agent 32 is added. According to the invention, the separation of phosphate and ammonium is preferably carried out after cooling and depressurisation of the reaction product, preferably after isolation of the synthesis gas 45.

For this purpose, the above-described apparatus can comprise a line 18 for adding the precipitating agent 32.

Preferably magnesium, calcium and potassium are suitable as precipitating agent 32. When using magnesium and/or calcium and/or potassium, plant-available ammonium phosphate, for example MAP, is obtained directly, which can be used directly as a fertiliser. A subject matter of the invention is plant-available fertiliser, for example MAP, obtainable by the method according to the invention. A subject matter of the invention is the use of plant-available fertiliser, for example MAP, obtainable by the method according to the invention.

Magnesium as precipitating agent 32 can for example be added In the form of MgO or $MgCl_2$. In this connection the temperature may for example be up to a maximum of 600 degrees Celsius, preferably up to a maximum of 550 degrees Celsius, particularly preferably up to a maximum of 500 degrees Celsius or 400 degrees Celsius or less, for example room temperature. The chosen temperature depends in this case on whether $Mg^{2+}$ is added before the separation of the third valuable substance fraction or after cooling and expansion of the reaction product. If $Mg^{2+}$ is added before the separation of the third valuable substance fraction, the subsequent addition can be omitted. Similarly, for the separation of phosphate and ammonium, $Ca^{2+}$ and $K^+$ can be added. Mixtures of different composition of $Mg^{2+}$ and $Ca^{2+}$ and $K^+$ can also be used for the separation. Preferably, $Mg^{2+}$ and/or $Ca^{2+}$ and/or $K^+$ are added in stoichiometric amounts or in a slight excess.

In particularly preferred embodiments of the invention, magnesium ammonium phosphate (abbreviated to "MAP", also called struvite) is separated in the valuable substance fractions. In particularly preferred embodiments of the invention plant-available MAP ($MgNH_4PO_{4\times6}$ $H_2O$) is enriched in the third and possibly the fourth valuable substance fraction, for example $MgNH_4PO_{4\times6}$ $H_2O$ (9.9% Mg, 7.3% $NH_4$, 39.0% $PO_4$, 43.8% $H_2O$). In this connection the obtained MAP is not a chemically pure product. The composition of the MAP depends inter alia on the feedstock used, and the composition of the aqueous multicomponent mixture. In the valuable substance fraction one or more compounds can be selected from MAP, potassium dihydrogen phosphate $KH_2PO_4$, diammonium hydrogen phosphate $(NH_4)_2HPO_4$, $P_2O_5$, superphosphate, calcium dihydrogen phosphate $(Ca_3(H_2PO_4)_2)$, calcium sulphate $2[CaSO_{4\times}2H_2O]$, double superphosphate, calcium dihydrogen phosphate $(Ca_3(H_2PO_4)_2)$, triple superphosphate, diammonium hydrogen phosphate $((NH_4)_2HPO_4)$, and also diammonium phosphate (diammonium phosphate, DAP, 18-46-0, ca. 18% N, 46% $P_2O_5$, 0% $K_2O$), $Ca_5Si_6O_{16}(OH)_{2\times4}H_2O$. Preferably, the phosphate and ammonium compounds separated in the valuable substance material fraction or fractions are water-soluble and readily available to plants. MAP and other phosphate-ammonium compounds are obtained in high yields by the present method. These compounds are low in harmful substances, and because of their good plant availability are ideally suitable as fertiliser or as raw material for fertiliser production. A subject matter of the invention are phosphorus and ammonium compounds obtainable by the method according to the invention. A subject matter of the invention is the use of phosphorus and ammonium compounds obtainable by the method according to the invention.

The use of phosphorus and ammonium compounds obtainable by the method according to the invention is also described here.

It is becoming quite clear that sewage sludge will in future be used in significantly smaller quantities for agricultural purposes, in particular due to the more stringent regulations governing the use of sewage sludge. The nutrients contained in the waste water and ultimately in the sewage sludge, especially phosphorus, should be returned in other ways in a qualitatively high-grade form to agriculture. Significant amounts of phosphorus can be recovered from waste water by a phosphorus recovery program. The present method provides magnesium ammonium phosphate and other phosphate-ammonium compounds as readily plant-available products and with a high effectiveness of at least 80%, preferably at least 85% or more.

A subject matter of the invention is the use of the method according to the invention or of an apparatus according to the invention for the separation, isolation and recovery of phosphate or for the production of fertiliser from aqueous multicomponent mixtures such as sewage sludge are also described here. A subject matter of the invention is also the use of the method or of an apparatus for the production of magnesium ammonium phosphate, calcium ammonium phosphate, potassium ammonium phosphate. The present method is suitable for the production of fertilisers, in particular high-quality, mineral fertilisers, in particular long-acting fertilisers from which the nutrients can be readily absorbed by plants, which is obtained as valuable fraction three and/or four from waste water and/or sewage sludge as an aqueous multicomponent mixture. A subject matter of the invention is the use of the method or of an apparatus for the production of fertilisers. Fertilisers from which nutrients can be readily absorbed by plants are termed "plant-available fertilisers". "Plant-available fertiliser" denotes a fertiliser from which plants can take up at least 50 wt. %, preferably at least 60 wt. %, particularly preferably at least 70 wt. % or more of the contained phosphate.

A subject matter of the invention is fertiliser, in particular plant-available fertilisers, for example fertiliser that contains at least 50 wt. % MAP, producible by the method according to the invention or by the apparatus according to the invention. A subject matter of the invention is fertiliser comprising one or more compounds selected from MAP, $KH_2PO_4$, $(NH_4)_2HPO_4$, $P_2O_5$, superphosphate, $(Ca_3(H_2PO_4)_2)$, $2[CaSO_4\times2H_2O]$, double superphosphate, $(Ca_3(H_2PO_4)_2)$, triple superphosphate, $((NH_4)_2HPO_4)$, $Ca_5Si_6O_{16}(OH)_2\times 4H_2O$ and producible by the method according to the invention, preferably in the apparatus according to the invention.

Compared to known methods for working up sewage sludge, the method according to the invention differs, inter alia, in that a valuable substance fraction is obtained, in which plant-available phosphate compounds are enriched. The third and/or fourth valuable substance fraction, which is also referred to as nutrient fraction and is enriched with the addition of $Mg^{2+}$ MAP, is characterised in particular by the fact that it does not contain heavy metals, toxic organic compounds or pharmaceutically or biologically harmful substances, and can therefore be used directly as a fertiliser for example.

"Enriched" in a valuable substance fraction or in the synthesis gas means that the valuable substance fraction or the synthesis gas consist substantially of one or more valuable substances. For example, at least 50 wt. % or 60 wt. %, preferably at least 70 wt. % or 80 wt. %, particularly preferably at least 90 wt. % or more than 95 wt. %, of one or more valuable substances.

Valuable substances are for example metals, heavy metals, metal ions, metal salts, metal oxides, heavy metal ions, heavy metal salts, heavy metal oxides, for example iron, iron salts, aluminium, aluminium salt, nickel, nickel salt, zinc, zinc salt, cadmium, cadmium salt, lead, lead salt, titanium, titanium salt, mercury, mercury salt, tin, tin salt, manganese, manganese salt, molybdenum, molybdenum salt, cobalt, cobalt salt, phosphorus, phosphorus oxide, phosphate, nitrogen, nitrogen oxides, ammonium, silicon, for example in the form of sand, calcium, for example in the form of sand, carbon in the form of carbon dioxide and methane, hydrogen. A subject matter of the invention are valuable substances producible by the method according to the invention. A subject matter of the invention is the use of valuable substances that can be produced by the method according to the invention.

A subject matter of the invention is the first valuable substance fraction 41 comprising one or more substances selected from metals, heavy metals, for example iron, aluminium, nickel, zinc, cadmium, lead, titanium, mercury, tin, manganese, molybdenum, cobalt, and metal alloys, silicon, for example in form of sand, calcium, for example in the form of sand, is characterised in that the first valuable substance fraction can be produced by the method according to the invention.

A subject matter of the invention is the second valuable substance fraction 42 comprising one or more substances selected from metal ions, metal salts, metal oxides, heavy metal ions, heavy metal salts, heavy metal oxides, for example iron salts, aluminium salts, nickel salts, zinc salts, cadmium salts, lead salts, titanium salts, tin salts, manganese salts, molybdenum salts, cobalt salts, is characterised in that the second valuable substance fraction 42 can be produced by the method according to the invention.

A subject matter of the invention is the third valuable substance fraction 43 comprising one or more substances selected from phosphorus, phosphorus oxide, phosphate, nitrogen, nitrogen oxides, ammonium, magnesium ammonium phosphate, calcium ammonium phosphate, potassium ammonium phosphate, $KH_2PO_4$, $(NH_4)_2HPO_4$, $P_2O_5$, superphosphate, $(Ca_3(H_2PO_4)_2)$, $2[CaSO_4 \times 2H_2O]$, double superphosphate, $(Ca_3(H_2PO_4)_2)$, triple superphosphate, $((NH_4)_2HPO_4)$, $Ca_5Si_6O_{16}(OH)_2 \times 4H_2O$, is characterised in that the third valuable substance fraction 43 can be produced by the method according to the invention.

A subject matter of the invention is the fourth valuable substance fraction 44 comprising one or more substances selected from phosphorus, phosphorus oxide, phosphate, nitrogen, nitrogen oxides, ammonium, magnesium ammonium phosphate, calcium ammonium phosphate, potassium ammonium phosphate, MAP, $KH_2PO_4$, $(NH_4)_2HPO_4$, $P_2O_5$, superphosphate, $(Ca_3(H_2PO_4)_2)$, $2[CaSO_4 \times 2H_2O]$, double superphosphate, $(Ca_3(H_2PO_4)_2)$, triple superphosphate, $((NH_4)_2HPO_4)$, $Ca_5Si_6O_{16}(OH)_2 \times 4H_2O$, is characterised in that the fourth valuable substance fraction 44 can be produced by the method according to the invention.

With the method according to the invention, the valuable substances that are contained in the aqueous multicomponent system can also be separated into more than three valuable substance fractions (in other words: more than three valuable substance fractions counting up to the process step of the thermochemical gasification in the reactor 8). This means that the valuable substances are separated and isolated into smaller valuable substance fractions. For this purpose the temperatures are raised to a maximum of 600, preferably at most 550 degrees Celsius in smaller steps (for example in 50 degree temperature steps), and more than three valuable substance fractions up to the method step of the thermochemical gasification can be correspondingly separated and optionally isolated. Corresponding to their respective solubility, fewer different valuable substances in a valuable substance fraction are obtained in this way compared to the three valuable substance fractions described in claim 1, which are obtained during the temperature rises to 200 to 550 degrees Celsius under supercritical conditions.

The person skilled in the art can easily make a corresponding adaptation of the method.

A subject matter of the invention is also the generated reaction product, in particular the synthesis gas 45. A subject matter of the invention is synthesis gas 45, which consists at least 80 vol. %, preferably least 90 vol. %, of carbon dioxide, methane and hydrogen and can be produced by the method according to the invention.

The method according to the invention differs from known methods in that the enrichment is carried out under supercritical conditions followed by thermochemical gasification without addition of catalysts and with exclusion of oxygen. By means of these reaction conditions a reaction product, in particular synthesis gas 45 and valuable substance fractions, are obtained, which differ from known reaction products.

In the method according to the invention a closed heat cycle is preferably used. The reaction product formed in the reactor 8 by means of thermochemical gasification under supercritical conditions (25-30 MPa and 600-700 degrees Celsius) has a high thermal energy. Preferably, the thermal energy of the reaction product is used to heat new feedstock 31. For example, the reaction product is led through the heat exchanger 4 and used to heat compressed aqueous multicomponent mixture. In a preferred embodiment of the method, the reaction product is led from the reactor 8 via the product line 13 into at least one, preferably at least two or three heat exchangers 4, and used to heat compressed aqueous multicomponent mixture. Preferably two or three or more heat exchangers 4 are arranged behind one another, through which the reaction product is led in succession and releases its thermal energy and thereby cools. Particularly preferably the reaction product is led into a first heat exchanger 4 in order to heat compressed aqueous multicomponent mixture at 300 to 400 degrees Celsius to 400 to 550 degrees Celsius, then led through a second heat exchanger 4 to heat compressed aqueous multicomponent mixture at 200 to 300 degrees Celsius to 300 to 400 degrees Celsius, then led through a third heat exchanger 4 to heat compressed aqueous multicomponent mixture from the initial temperature to 200 to 300 degrees Celsius. The starting temperature of the compressed aqueous multicomponent mixture in the feedstock line 12 is 0 to 50 degrees Celsius, preferably 15 to 30 degrees Celsius, particularly preferably about 25 degrees Celsius.

The method according to the invention comprises cooling the reaction product to below 50 degrees Celsius. The reaction product is subsequently or simultaneously depressurised (expanded) to a pressure of less than 1 MPa, preferably less than 0.5 MPa. The synthesis gas 45 is dissolved in the water 46 under supercritical conditions, as exist for example in the reactor 8. The water 46 and synthesis gas 45 form a phase at temperatures between 600 and 700 degrees Celsius and pressures above 25 MPa. Synthesis gas 45 and water 46 are separated by cooling and expansion. The synthesis gas 45 can be separated and used further. For example, the method according to the present invention may include the separation of hydrogen from synthesis gas 45. For example, the method according to the present invention may include the separation of carbon dioxide from synthesis gas 45. For example, the method according to the invention may include the separation of hydrogen from the synthesis gas 45. The synthesis gas 45 can be used for example in combined heat and power plants (CHP). The synthesis gas 45 obtained can be used with or without previous transfer to a gas storage tank 15, for example as follows: the synthesis gas 45 can be used to generate electricity, for example fed into a combined heat and power plant (CHP) 17; hydrogen can be separated from the synthesis gas 45 in a gas treatment plant, and the hydrogen can then be used for example for portability or industrial applications, and optionally the remaining synthesis gas, which consists mainly of $CO_2$, $CH_4$ and alkanes, can be used to generate electricity; the synthesis gas can be used to produce chemical products such as methanol; the synthesis gas 45 and waste heat from the method can be used to generate useful heat, for example steam. The aqueous residue or the water 46 or water jet can for example be directly used further or discharged; can be mixed with precipitating agent such as $Mg_{2+}$, $Ca^{2+}$ or $K^+$, and separated phosphate and/or ammonium can be isolated, preferably via a separator 5; can be filtered and then used further or discharged; can be used for the dilution of new feedstock 31.

A subject matter of the invention is a method for the fractional separation of valuable substances from aqueous multicomponent mixtures in an apparatus comprising a pump 3, heat exchanger 4, reactor 8 with superheater 7 and separator 5, wherein the aqueous multicomponent mixture is pumped into the apparatus and compressed to 25 to 35 MPa, the compressed aqueous multicomponent mixture is heated to 200 to 300 degrees Celsius and a first valuable substance fraction 41 is separated, in which solids are enriched, the compressed aqueous multicomponent mixture is further heated to 300 to 400 degrees Celsius and a second valuable substance fraction 42 is separated, in which metal salts are enriched, the compressed aqueous multicomponent mixture is further heated to 400 to 550 degrees Celsius and a third valuable substance fraction 43 is separated, in which phosphate and ammonium are enriched, the compressed aqueous multicomponent mixture in the reactor 8 is heated to a maximum of 700 degrees Celsius, and remains for 1 to 5 minutes, preferably 2 to 3 minutes at this temperature and a pressure of 25 to 30 MPa in the reactor 8, and the formed reaction product is then cooled by passing it into one or more heat exchangers 4 and cooled reaction product at a temperature of less than 50 degrees Celsius, preferably less than 30 degrees Celsius, is depressurised to a pressure of less than 1 MPa, preferably less than 0.5 MPa and the reaction product is thereby separated into synthesis gas 45 and water 46 and the synthesis gas 45 and the water 46 are collected separately, and then precipitating agent 32 is optionally added to the water and a fourth valuable substance fraction 44, in which phosphate and ammonium are enriched, is separated by means of a separator 4. In the method the formed reaction product is preferably led by means of the product line 13 through a heat exchanger 4 for heating compressed aqueous multicomponent mixture to 400 to 550 degrees Celsius, is led via the product line 13 into a second heat exchanger 4 for heating compressed aqueous multicomponent mixture to 300 to 400 Grad Celsius, is led via the product line 14 into a further heat exchanger 4 for heating compressed aqueous multicomponent mixture to 200 to 300 degrees, and the reaction product is thereby cooled.

In order to prevent blockage of the pump 3, the components in the aqueous multicomponent mixture before the compression to 25 to 35 MPa are crushed into particles having a mean diameter less than 5 mm, preferably less than 3 mm, particularly preferably less than 2 mm or 1 mm. A cutting device 2 can be used for this purpose.

A subject matter of the invention is also an apparatus for carrying out the method according to the invention. A subject matter of the invention is an apparatus comprising a storage tank 1, a cutting device 2, a pump 3, at least three heat exchangers 4, separator 5 for separating the valuable substance fractions, valves 6, at least one reactor 8 with superheater 7, demister 9, separating vessel 10, synthesis gas line 11, feedstock line 12, product line 13, cooler 14, gas storage tank 15, circulating water line 16, power generator 17, line for precipitating agent 18. A subject matter of the invention is also an apparatus for carrying out the method according to the invention. A subject matter of the invention is an apparatus, comprising a storage tank 1, a cutting device 2, a pump 3, at least three heat exchangers 4, separator 5 for separating the valuable substance fractions, valves 6, at least one reactor 8 with superheater 7, demister 9, separating vessel 10, synthesis gas line 11, feedstock line 12, product line 13, cooler 14, gas storage tank 15, circulating water line 16, power generator 17, line for precipitating agent 18, characterised in that the reaction product that is formed in the heating of the compressed aqueous multicomponent mixture to a maximum 700 degrees Celsius in the reactor 8 is returned to the product line 13 and led through a heat exchanger 4 for heating compressed aqueous multicomponent mixture to 400 to 550 degrees Celsius, is led in the product line 13 into a second heat exchanger 4 for heating compressed aqueous multicomponent mixture to 300 to 400 degrees Celsius, is led via the product line 13 into a further heat exchanger 4 for heating compressed aqueous multicomponent mixture to 200 to 300 degrees.

Subject matters of the invention are embodiments of the apparatuses as described in FIG. 1, FIG. 2 and FIG. 3.

A subject matter of the invention is an apparatus for carrying out the method according to the invention, comprising a storage tank 1 for receiving the aqueous multicomponent mixture, feedstock line 12 for supplying the aqueous multicomponent mixture, a cutting device 2 for comminuting the aqueous multicomponent mixture, a pump 3 for compressing the aqueous multicomponent mixture, at least three heat exchangers 4 for heating the compressed aqueous multicomponent mixture up to 550 degrees Celsius, at least three separators 5 for separating the first to third valuable substance fraction 41, 42, 43, valves 6 for separating the valuable substance fractions, pump 3 and line for precipitating agent 18 for adding the precipitating agent 32 to the third separator 5.

This apparatus may further comprise at least one reactor 8 with superheater 7 for the production of the reaction product, product line 13 for feeding the reaction product, optionally a cooler 14 for cooling the reaction product to below 50 degrees Celsius, at least one valve 6 for expansion of the reaction product, at least one separation vessel 10 with demister 9 for the separation of the synthesis gas 45, synthesis gas line 11 for transferring the synthesis gas 45 for a further use, optionally a gas storage unit 15 for temporary storage of the synthesis gas 45.

This apparatus may further comprise a fourth separator 5, at least one pump 3 and line for precipitating agent 18 for introducing the precipitating agent 18 into the fourth separator 5 for separating the fourth valuable substance fraction 44, optionally a further separator 5 for separating the fourth valuable fraction 44, optionally a circulation water line 16, optionally a power generator 17.

A piston pump for example is suitable as pump 3 in the apparatus. A cyclone for example is suitable as separator 4 in the apparatus. In order to achieve the rapid heating of the compressed aqueous multicomponent mixture, heat exchangers 4 will be used.

The supercritical state of the aqueous multicomponent mixture in the method according to the invention occurs at pressures higher than 22.1 MPa and temperatures higher than 374 degrees Celsius. Pressures of at least 25 MPa are used in the method. In this connection the pressure in the system preferably remains at the same level. This is ensured by valves 6, in particular pressure compensation valves. Pressure compensation valves may be located at one or more locations in the apparatus, via which the pressure equalisation is regulated and the maintenance of the pressure level is achieved. New feedstock 31 (aqueous multicomponent mixture) is supplied and formed reaction products (water 46 and synthesis gas 45) and also the valuable substance fractions 41, 42 and 43 are discharged.

Under supercritical conditions the ion solubility varies depending on the temperature and at the same time water changes from a polar solvent to a non-polar solvent. This property of supercritical water is used for the fractional separation (isolation) of valuable substances from aqueous multisubstance mixtures. Aqueous multi-substance mixtures such as sewage sludge and aqueous organic wastes are thus completely broken down into their valuable substance components and the separated fractions are sent for further use in the valuable substance circulation.

In the method according to the invention aqueous multicomponent mixtures can be split into smaller valuable substance fractions. The enrichment of the valuable substance fractions is then carried out over more than three stages, wherein in the method at a pressure of at least 25 MPa smaller temperature intervals are chosen and the enriched valuable substances are separated into smaller fractions. For example, the temperature can be increased in 50 degree steps starting at 200 degrees Celsius. Accordingly, more valuable substance fractions, containing fewer different valuable substances, are obtained. In the limiting case the temperature intervals are chosen to be so small that individual valuable substances are enriched separately from one another.

The invention is described in more detail in the following figures. However, the figures do not restrict the invention to these embodiments.

FIG. 1 shows an apparatus for carrying out the method according to the invention with a storage tank 1, cutting device 2, pump 3, feedstock line 12, heat exchanger 4, separator 5, valve 6, reactor 8 with superheater 7, product line 13, cooler/dryer 14, gas storage tank 15, circulation water line 16, power generator 17, e.g. gas turbine, combined heat and power plant, line with precipitating agent 18. The storage tank 1 is filled with feedstock 31. The first valuable fraction 41, the second valuable fraction 42, the third valuable fraction 43 and the fourth valuable fraction 44 are withdrawn via valves. Water 46 can also be discharged or fed into the circulating water line 16. Synthesis gas 45 is collected in a gas storage tank 15 and converted into electric current 47 via a power generator 17. The addition of precipitating agent 32 is carried out via a pump 3 and line with precipitating agent 18 after separation of the synthesis gas 45 from the reaction product in the fourth valuable substance fraction 44.

FIG. 2 shows an apparatus for carrying out the method according to the invention with a storage tank 1, cutting device 2, pump 3, feedstock line 12, heat exchanger 4, separator 5, valve 6, reactor 8 with superheater 7, product line 13, cooler/dryer 14, gas storage tank 15, circulation water line 16, power generator 17, e.g. gas turbine, combined heat and power plant, line with precipitating agent 18. The storage tank 1 is filled with feedstock 31. The first valuable fraction 41, the second valuable fraction 42, the third valuable fraction 43 and the fourth valuable fraction 44 are withdrawn via valves. Water 46 can also be discharged or fed into the circulating water line 16. Synthesis gas 45 is collected in a gas storage tank 15 and converted into electric current 47 via a power generator 17. The addition of precipitating agent 32 is carried out via a pump 3 and line with precipitating agent 18 in the third valuable substance fraction 43 by adding the precipitating agent to the compressed feedstock 31 in the third separator 5.

FIG. 3 shows an apparatus for carrying out the method according to the invention with a storage tank 1, cutting device 2, pump 3, feed line 12, heat exchanger 4, separator 5, valve 6, reactor 8 with superheater 7, product line 13, cooler/dryer 14, gas storage tank 15, circulation water line 16, power generator 17 e.g. gas turbine, combined heat and power plant, line with precipitating agent 18. The storage tank 1 is filled with feedstock 31. The first valuable fraction 41, the second valuable fraction 42, the third valuable fraction 43 and the fourth valuable fraction 44 are withdrawn via valves. Water 46 can also be discharged or fed into the circulating water line 16. Synthesis gas 45 is collected in a gas storage tank 15 and converted into electric current 47 via a power generator 17. The addition of precipitating agent 32 is carried out via a pump 3 and line with precipitating agent 18 in the reactor 8 and separation of the fourth valuable substance fraction 44 via a valve 6.

In the description, the same reference numerals are used for the same and equivalent parts.

It should be noted at this point that all the above-described parts taken per se individually and in any combination, in particular the details illustrated in the drawings, are claimed as essential to the invention. Variations thereof are familiar to the person skilled in the art.

REFERENCE NUMERALS

Apparatus for carrying out the method:
1 storage tank
2 cutting device
3 pump
4 heat exchanger
5 separator
6 valve
7 superheater
8 reactor
9 demister (droplet separator)
10 separating vessel
11 synthesis gas line
12 feedstock line
13 product line
14 cooler/dryer
15 gas storage tank
15 circulation water line
16 electric current generator (gas turbine/combined heat and power unit)
18 line with precipitating agent
Feedstocks:
31 feedstock, in particular aqueous multicomponent mixture
32 precipitating agent
Valuable substances:
41 first valuable substance fraction
42 second valuable substance fraction
43 third valuable substance fraction
44 fourth valuable substance fraction
45 synthesis gas
46 water
47 electric current

The invention claimed is:

1. A method for the fractional separation of a plurality of substances from an aqueous multicomponent mixture, comprising compression of the aqueous multicomponent mixture to 25 to 35 MPa, heating of the compressed aqueous multicomponent mixture to 200 to 300 degrees Celsius and removal of a first substance fraction wherein the first substance fraction comprises solids, further heating of the compressed aqueous multicomponent mixture to 300 to 400 degrees Celsius and removal of a second substance fraction wherein the second substance fraction comprises metal salts, further heating of the compressed aqueous multicomponent mixture to 400 to 550 degrees Celsius and removal of a third substance fraction wherein the third substance fraction comprises phosphate and/or ammonium.

2. The method according to claim 1, wherein the compressed aqueous multicomponent mixture, after the separation of the first, second and third substance fractions is heated in a reactor with exclusion of oxygen for one to five minutes to a maximum of 700 degrees Celsius, forming a reaction product that comprises synthesis gas and water.

3. The method according to claim 2, wherein the reaction product is guided into a product line and the product line containing the reaction product is guided through a heat exchanger in which thermal energy is transferred from the reaction product to compressed aqueous multicomponent mixture, which heats the compressed aqueous multicomponent mixture to 400 to 550 degrees Celsius.

4. The method according to claim 2, wherein the reaction product is guided in a product line through a second heat exchanger in which thermal energy is transferred from the reaction product to compressed aqueous multicomponent mixture, which heats the compressed aqueous multicomponent mixture to 300 to 400 degrees Celsius.

5. The method according to claim 2, wherein the reaction product is guided in a product line through a further heat exchanger in which thermal energy is transferred from the reaction product to compressed aqueous multicomponent mixture, which heats the compressed aqueous multicomponent mixture to 200 to 300 degrees Celsius.

6. The method according to claim 1, wherein a precipitating agent is added to the compressed aqueous multicomponent mixture after heating of the compressed aqueous multicomponent mixture to 400 to 550 degrees Celsius.

7. The method according to claim 2, wherein a precipitating agent is added to the reaction product, and a fourth substance fraction is separated and isolated.

8. The method according to claim 6, wherein the precipitating agent is selected from $Mg^{2+}$ or $Ca^{2+}$ or $K^+$ or $Mg^{2+}$ and $Ca^{2+}$ or $Mg^{2+}$ and $K^+$ or $Ca^{2+}$ and $K^+$ or $Mg^{2+}$ and $Ca^{2+}$ and $K^+$, and wherein the ions are used in the form of their salts.

9. The method according to claim 1, wherein the aqueous multicomponent mixture is selected from sewage sludge, organic waste, aqueous organic waste, industrial waste, municipal waste, animal waste, agricultural waste, garden waste, animal meal, vegetable waste, marc, fly ash, sewage sludge fly ash, food industry waste, drilling mud, sludge, waste from biogas plants, digestate, liquid manure and waste water.

10. The method according to claim 1, wherein the method further comprises purifying water, producing phosphorus compounds, producing ammonium compounds, producing sand, producing metals, producing metal salts from aqueous multicomponent mixtures, or producing hydrogen and/or generating electricity.

* * * * *